Figure 1:
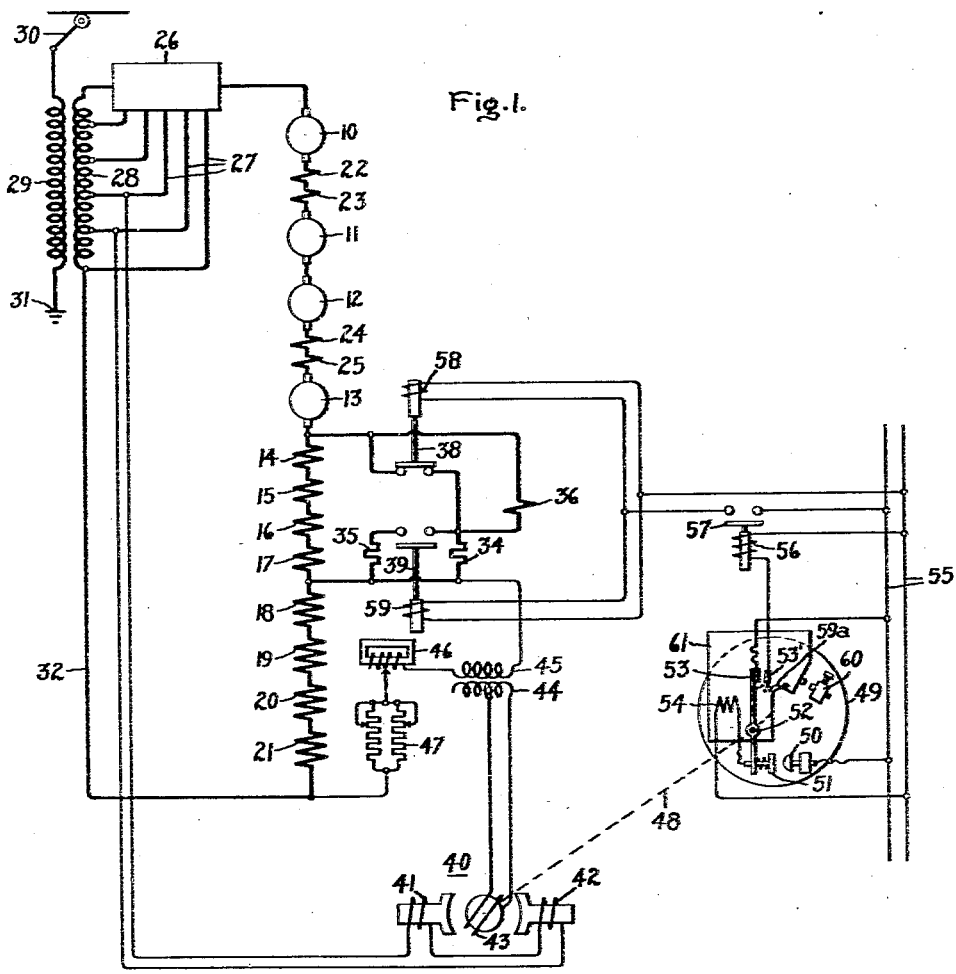

May 28, 1940.

J. W. McNAIRY 2,202,708

CONTROL SYSTEM

Filed June 3, 1939

2 Sheets-Sheet 1

Inventor:
Jacob W. McNairy,
by Harry E. Dunham
His Attorney.

May 28, 1940.  J. W. McNAIRY  2,202,708
CONTROL SYSTEM
Filed June 3, 1939   2 Sheets-Sheet 2

Inventor:
Jacob W. McNairy,
by Harry E. Dunham
His Attorney.

Patented May 28, 1940

2,202,708

UNITED STATES PATENT OFFICE 2,202,708

CONTROL SYSTEM

Jacob W. McNairy, Erie, Pa., assignor to General Electric Company, a corporation of New York Application June 3, 1939, Serial No. 277,250

7 Claims. (Cl. 172—276)

My invention relates to control systems, more particularly to motor control systems provided with means responsive to an electrical condition of the circuit, such as a motor circuit, for controlling the circuit and has for its object a simple and reliable system of this character.

My invention has a special application in the control of alternating current motors of the commutator type and specifically the control of the phase relation and magnitude of the current in the commutating or interpole fields in accordance with the speed of the motor. This is necessary to maintain the correct commutating conditions and prevent arcing at the brushes for all speeds of the motor. This is conventionally done by controlling the connection of resistances and reactors in parallel with the interpole field windings, the connections being controlled in accordance with the speed of the motor.

United States Patent No. 1,972,688 to McNairy and Pritchard, issued September 4, 1924, describes and claims relay means responsive to the current and voltage conditons of the motor circuit for giving the desired speed response for the control of the interpole shunt circuit connections. My present invention is an improvement over the invention of this patent.

In carrying out my invention in one form, I utilize a relay for controlling the interpole field winding connections, this relay being provided with inductively cooperating windings one of which is rotatably mounted. One of these windings is connected to be energized from the supply source for the motor. The other winding is connected for energization by the voltage across the exciting field winding of the motor with reactance and resistance in the circuit to give a predetermined phase relation between the currents in the two windings of the relay.

In the operation of the motor, a change in motor speed with the motor current remaining constant causes a change in the phase angle of the exciting field winding voltage with respect to the supply voltage. This causes a corresponding change in phase of the current in the relay coil connected to the exciting field winding with consequent operation of the relay. An increase in motor current, the speed remaining constant, produces an increase in the voltage across the exciting field winding with increased current in the relay winding connected thereto and a shift in phase of the current in this winding by reason of the effect of the resistance and reactance in its circuit. As a result, the rotatable winding of the relay turns in the same direction as for a corresponding change in speed. In other words the relay turns in the same direction for increased speed and increased load.

The response of the relay to the exciting field current can be varied by providing a suitable resistor and reactor in the exciting field winding circuit supplying one coil of the relay. The relay, for example, may be arranged to change the interpole field winding connections when the same motor speed is reached regardless of the load. Also the relay may have a varying speed response, that is, operate to change the interpole field winding connections at different speeds dependent upon the load. These response characteristics are determined by the rapidity with which the reactor saturates.

For a more complete understanding of my invention, reference should be had to the accompanying drawings in which Fig. 1 shows a system of motor control embodying my invention while Figs. 2, 3, 4 and 5 are vector diagrams of the voltage and current relations in the relay and motor circuits.

Referring to the drawings, I have shown my invention in one form as applied to an electric vehicle or traction motor drive system provided with four single-phase alternating current motors 10, 11, 12 and 13 of the series field commutator type which are provided respectively with armatures 10, 11, 12 and 13, with commutating or interpole fields 14, 15, 16 and 17 and with exciting fields 18, 19, 20 and 21. The motors are also provided with compensating field windings 22, 23, 24 and 25.

The motor armatures and field windings are connected in series relation with each other as shown, although it will be understood that the system may have switching means (not shown) for connecting the motors in suitable parallel relation with each other. One terminal of the motor circuit is connected to a controller 26 comprising suitable switching means for connecting this terminal to a selected one of a plurality of taps 27 on the secondary winding 28 of a supply transformer having its primary winding 29 connected to the trolley 30 and ground 31. The other terminal of the circuit is connected through a conductor 32 directly to one terminal of the secondary winding 28. It will be understood that the controller 26 will be suitably operated under the control of an operator to change the tap connections with the transformer secondary winding 28 so as to control the speed of the motors.

For the purpose of changing the phase relation and magnitude of the current in the interpole windings 14, 15, 16 and 17, resistors 34 and 35 and reactor 36 are provided, with electromagnetically operated switches 38 and 39 for controlling the connections of these resistors and reactors across the interpole field windings. Thus, at low speed, the switch 38 will be closed and the switch 39 open to connect the resistor 34 across the interpole field windings. At high speed, the switch 38 will be open while the switch 39 will be closed to connect the resistors 34 and 35 in parallel with each other and in series with the reactor 36 across the interpole windings.

The means responsive to the current conditions in the motor circuit in such manner as to operate in a predetermined relation to speed for controlling the switches 38 and 39 is a relay 40 comprising a stator member or laminated iron field structure provided with the two field windings 41 and 42 which are connected in series with each other to the supply source, as shown to a selected pair of the taps 27. The relay is also provided with a rotatably mounted field structure provided with a rotor winding 43 which is in the form of a single coil having its turns wound about a common axis. This rotor winding 43 is connected to the secondary winding 44 of a transformer having its primary winding 45 connected across the exciting field windings 18, 19, 20 and 21 in series with a saturable reactor 46 and a variable resistance 47. The reactor 46 is constructed in a manner well known to those skilled in the art with an iron core which at a predetermined current in the reactor coil begins magnetically to saturate The rotor of the relay 40 is connected by a shaft indicated by the dotted line 48 to a rotatably mounted disk 49 carrying a contact 50. This contact 50 is arranged when the disk is turned in a clockwise direction as seen in Fig. 1 to engage a contact 51 which is mounted on one end of an arm having a stationary pivot 52 and bearing on its other end a contact 53. When the contact 50 engages the contact 51, a coil 54 is connected thereby across a suitable supply source 55 and energized to attract the arm and move the contact 53 away from engagement with the stationary contact 53' whereby the coil 56 is deenergized to open a switch 57 in circuit with the coils 58 and 59 for the switches 38 and 39. The contact 51 is resiliently mounted on the lower end of the arm so that when the contact 50 engages the contact 51 the arm may move relative to the contact 51 away from engagement with the contact 53'. A spring 59a will bring contacts 53 and 53' into engagement when the coil 54 is deenergized by contacts 50 and 51 parting.

The disk 49 is also provided with an adjustable stop 60 which cooperates with the stationary support 61 on which is mounted the arm, the coil 54 and the contact 53'.

When the transformer secondary winding 20 is excited, but before the motor circuit is closed, the excitation of the coils 41 and 42 induces a current in the closed circuit of the rotor winding 43 leading through the secondary 44 which develops torque enough to turn the rotor and disk 49 clockwise as seen in the drawing, until the coil 43 has its axis at right angles with the axis of the stationary field windings 41 and 42. This brings the contact 50 into engagement with the contact 51 whereby the switch 38 is closed and the switch 39 opened as previously described.

When the motor circuit is energized, the voltage across the exciting field windings 18 to 21 inclusive will change in value in accordance with the motor current, and in phase angle in accordance with the motor speed, and thus cause counterclockwise rotation of the disk 49 so as to separate the contacts 50 and 51 and open the switch 38 and close the switch 39 upon the occurrence of predetermined speed and load conditions.

This operation of the relay will be understood from an examination of the vector diagrams, Figs. 2 to 5 inclusive. It will be understood that the rotor of the relay seeks a position in which there is no torque tending to turn it, and this position is a position in which the current in the rotor winding 43 is in a 90 degree vector relation with the current in the stator windings 41 and 42. The relay initially moves to this position when its stator windings are energized, the rotor winding then coming to rest at right angles with the field windings. When the phase angle of the current supplied to the rotor winding changes, a torque is developed which turns the rotor to a position to reestablish this 90 degree phase relation between the rotor current and the stator current.

Figure 2:
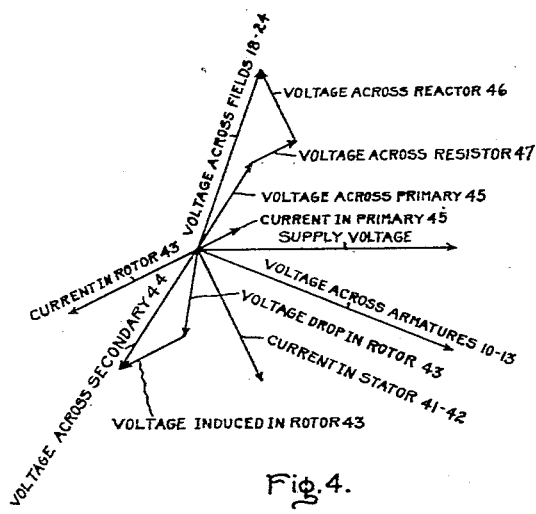

Fig. 2 shows the normal 90 degree relationship between the rotor and stator currents. For clarity, legends have been applied to the various vectors in Fig. 2 and it is believed that the vectors in Figs. 3, 4 and 5 will be readily identified from these legends on Fig. 2.

Figure 3:
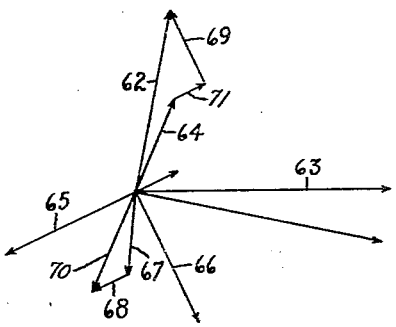

Fig. 3 shows the changes which have been caused by an increase in speed with respect to Fig. 2 but with the same motor current as in Fig. 2. This increase in speed caused the exciting field voltage 62 to increase its angle of lead with respect to the supply voltage whereby the angle of lead of the primary voltage 64 of the transformer 45 is increased. However, under these circumstances, in order to maintain a 90 degree phase angle relation between the rotor current 65 and the stator current 66, the rotor voltage 67 must be maintained in the same phase position as in Fig. 2. In order to bring the rotor voltage 67 back to this phase relation, the induced rotor voltage 68 must change and must decrease with respect to Fig. 2. This unbalance produces a torque in the rotor and the rotor turns until equilibrium is again restored as indicated in Fig. 3.

Figure 4:
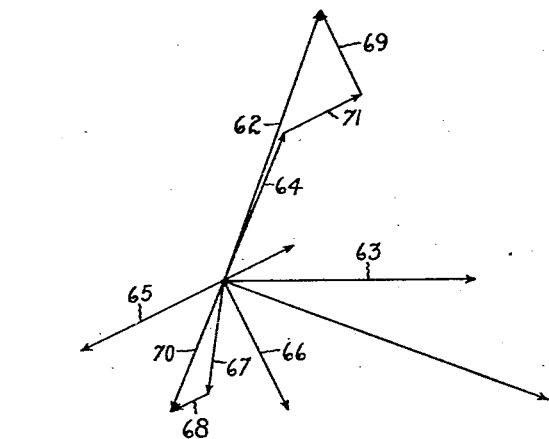

Fig. 4 shows the change in phase angles which have been caused by an increase in the motor currents as compared with Fig. 2 but with the speed remaining the same as in Fig. 2. This produces an increase in the exciting field voltage 62 almost in proportion to the load increase but the reactor voltage 69 does not increase in the same proportion because of the saturation of the reactor 46. Again the relay is thrown out of equilibrium and the induced rotor voltage 68 must decrease with respect to Fig. 1. The rotor of the relay turns in a counterclockwise direction until equilibrium is again established and, as indicated in Fig. 4, the rotor amperes 65 are at right angles with the stator amperes 66.

When the rotor has thus been turned far enough as a result of increase 1 speed or load, or both, the contact 50 disengages the contact 51 to change the interpole shunt connections as previously described.

Figure 5:
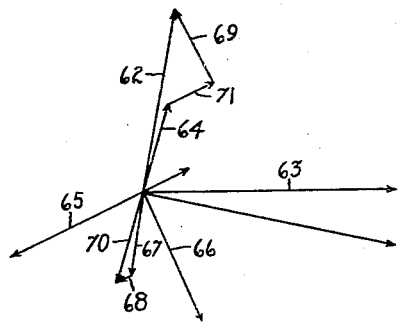

Furthermore, a change in the resistance 47 will produce a shift in the primary and secondary voltages 64 and 67 and thus cause rotation of the relay. Fig. 5 shows a change in the vector 76.

relations produced by an increase in the resistance 47 with respect to Fig. 2. This caused an increased phase angle lead for the primary voltage 64 and unbalance of the relay which turned in a counterclockwise direction to establish equilibrium, the induced voltage 68 in the rotor being thereby decreased.

It will be understood that when the relay rotor 43 has turned initially to a position with its winding at right angles with the stator windings, and the motor is then energized, the voltage 70 supplied by the secondary winding 44 is so related in phase with the supply voltage that the equilibrium condition of the relay is not disturbed. As shown in Fig. 2, this secondary winding voltage lags considerably more than 90 degrees with respect to the supply voltage. This phase relation of the secondary winding voltage is obtained as desired by a suitable adjustment of the values of the reactance 46 and the resistance 47.

As previously noted, an increase in the speed of the motor increases the lead of the exciting field voltage 62 while an increase in the load, i. e., motor current, increases the lead of the voltage 64 applied to the primary winding 45 with respect to the supply voltage, the exciting field voltage 62 phase angle remaining unchanged. This latter current response is obtained by the action of the reactor 46 and resistor 47 and also by the effect of the reactance of the primary winding 45.

The resistance 47, of course, introduces a voltage 71 which is directly responsive to the motor current as reflected by the voltage across the exciting windings. The reactor 46 however introduces a voltage 69 which is dependent upon the rate of saturation of the reactor. When the reactor begins to saturate, its voltage drop of course does not increase as fast as the increase in current and, as a result, the resistor voltage drop 71 has a proportionately greater effect so that when the reactor saturates, the required phase shift of the primary winding voltage 64 to cause operation of the relay is obtained at a lower speed than if the reactor were unsaturated. This is due to the fact that the increase in reactor voltage tends to offset the effect of increased resistor voltage in shifting the voltage 64.

By suitably proportioning the reactor 46 and the resistor 47, the relay can be made to operate at the same speed for all motor currents as long as the reactor remains unsaturated. By changing the rate of saturation of the reactor 46, the relay can be made to operate at decreasing speeds with increasing motor currents.

When the reactor 46 becomes saturated, the voltage drop across the reactor does not increase thereafter at the same rate as the current and therefore the resistor voltage drop has an increasing effect on the operation of the relay. This means that the relay then is more responsive to load. In other words its response to load is not offset to such an extent as before by the reactor voltage and consequently the relay operates at decreasing speeds for increasing loads.

For example, as applied to a typical motor and with a rapidly saturating reactor, the relay operated at 62 M. P. H. with 500 amperes motor current, 57 M. P. H. with 1000 amperes motor current, and at 50 M. P. H. with 2000 amperes motor current. On the other hand with a reactor which did not saturate over this range of motor current values the relay operated at substantially the same speed of 50 M. P. H. for all currents in this range.

While I have shown a particular embodiment of my invention, it will be understood, of course, that I do not wish to be limited thereto, since many modifications may be made and I, therefore, contemplate by the appended claims to cover any such modifications as fall within the true spirit and scope of my invention.

What I claim as new and desire to secure by Letters Patent of the United States is:

1. In combination, a single-phase alternating current motor provided with exciting and interpole field windings and an armature winding, means for supplying an alternating current to said motor, means for controlling the connections of said interpole field winding comprising a stator winding, a rotatably mounted winding inductively associated with said stator winding, circuit control means operated by said rotor for controlling the connections of said interpole field windings, means connecting one of said windings to said supply means, and connections for connecting the other of said windings across said exciting field winding for energization in accordance with the voltage of said exciting field winding, and a saturable reactor included in said connections for offsetting the effect of changes in the current in said motor and thereby causing said rotor to operate said control means at a predetermined speed of said motor, said reactor being constructed to begin to be saturated magnetically by predetermined currents through said reactor thereby to cause operation of said rotor at decreasing speeds with increasing currents in the circuit of said motor.

2. In combination, a single-phase alternating current motor of the commutator type provided with exciting and interpole field windings and an armature winding, means for supplying an alternating current to said motor, means for controlling the connections of said interpole field winding including a relay device provided with a stator winding and a rotatably mounted winding, means connecting one of said windings to said supply means, and connections for connecting the other of said windings for energization in accordance with the voltage of said exciting field winding whereby said relay is operated by the phase shift of said voltage in response to changes in motor speed, and a saturable reactor in circuit with said last mentioned winding for producing a phase shift of the voltage applied to said winding in response to changes in the current in said motor thereby to offset the effect of such changes in the current in said motor, said reactor being constructed to begin to be saturated magnetically by predetermined currents therethrough thereby to cause operation of said rotor at decreasing speeds with increasing currents in said motor 3. In combination, a single-phase alternating current motor of the commutator type provided with exciting and interpole field windings and an armature winding, means for supplying an alternating current to said motor, means for controlling the connections of said interpole field winding comprising a relay provided with a stator winding, means connecting said stator winding to said supply means, a rotatably mounted winding inductively associated with said stator winding, and arranged to turn to control said interpole field winding connections in response to a shift in the phase angle of the voltage applied thereto, a reactor, a resistance, a transformer provided with a primary winding and a secondary winding, means connecting said secondary winding to said rotor winding, and connections for connecting said resistance, reactor and primary winding in series with each other across said exciting field winding, whereby the voltage applied to said rotatably mounted winding shifts in phase with respect to the voltage applied to said stator winding to produce rotation of said relay.

4. In combination, a single phase alternating current motor of the commutator type provided with exciting and interpole field windings and an armature winding, means for supplying an alternating current to said motor, means for controlling the connections of said interpole field winding comprising a relay provided with a stator winding, means connecting said stator winding to said supply means, a rotatably mounted winding inductively associated with said stator winding and arranged to turn to control said interpole field winding connections in response to a shift in the phase angle of the voltage applied thereto, a reactor, a resistance, a transformer provided with a primary winding and a secondary winding, means connecting said secondary winding to said rotor winding, and connections for connecting said resistance, reactor and primary winding in series with each other across said interpole field winding, said reactor being arranged to become saturated at a predetermined motor current whereby said relay operates to control the connections of said interpole field winding at decreasing speeds with increase in motor current.

5. In combination, a single-phase commutator motor having an exciting field winding, an armature winding, and an interpole field winding, a plurality of shunt connections for controlling the phase relation and magnitude of the current flowing through said interpole field winding, means for supplying an alternating current to said motor, a relay for controlling said interpole shunt connections comprising a stator winding, means connecting said stator winding to said supply means, a rotatably mounted winding inductively associated with said stator winding, a transformer having its secondary winding connected to said rotor winding to supply a current to said rotor winding in 90 degree phase relation with the current in said stator winding, and connections between said primary winding of said transformer and said exciting winding including a reactor and a resistor whereby variations in the magnitude of the voltage across said exciting winding and in the phase relation of the current in said exciting winding to said supply voltage produce a shift in the phase relation of the current in said rotor winding with respect to the current in said stator winding whereupon said rotor winding turns to reestablish said 90 degree current relation, and switching means controlled by movement of said rotor winding for controlling said shunt connections.

6. In combination, a single phase alternating current motor provided with exciting and interpole field windings and an armature winding, connections for supplying an alternating current to said motor, control means responsive to the phase angle of the voltage across said exciting field winding for controlling the connections of said interpole field winding in accordance with the speed of said motor, a resistance connected in circuit with said control means for introducing a voltage directly proportional to the voltage across said exciting field winding and the current in the circuit of said motor thereby to cause operation of said control means to control the connections of said interpole field winding at decreasing speeds with increasing loads, a saturable reactance in circuit with said control means for introducing a voltage offsetting the effect of the voltage across said resistance, said reactance being constructed magnetically to saturate and thereby increase the effect of the voltage across said resistance to cause said control means to operate at decreasing motor speeds with increasing currents in the circuit of said motor.

7. In combination, a single phase alternating current motor provided with exciting and interpole field windings and an armature winding, connections for supplying an alternating current to said motor, control means responsive to the phase angle of the voltage across said exciting field winding for controlling the connections of said interpole field winding in accordance with the speed of said motor, a resistance connected in circuit with said control means for introducing a voltage in circuit with said control means directly proportional to the voltage across said exciting field winding and the current in the circuit of said motor thereby tending to cause operation of said control means to control the connections of said interpole field winding at decreasing speeds with increasing current in the circuit of said motor, a reactance in circuit with said control means for introducing a voltage into said circuit tending to offset the effect of the voltage across said resistance, said reactance being constructed to begin magnetically to saturate at a predetermined voltage across said exciting field winding corresponding to a predetermined current in the circuit of said motor after which for higher motor currents said reactor voltage increases at a rate disproportionately less than the rate of increase of the current in said motor thereby to increase disproportionately the effect of increases in the voltage across said resistance and cause said control means to operate at decreasing motor speeds with increasing currents in the circuit of said motor.

JACOB W. McNAIRY.